United States Patent  [19]

Sato et al.

[11] 3,974,122

[45] Aug. 10, 1976

[54] HEAT-CURABLE SILICONE RESIN COMPOSITIONS

[75] Inventors: Yasuhiko Sato; Akitoshi Komiya; Toshio Shiobara, all of Annaka, Japan

[73] Assignee: Shin-Etsu Chemical Co., Ltd., Tokyo, Japan

[22] Filed: Oct. 17, 1975

[21] Appl. No.: 623,331

[30] Foreign Application Priority Data

Oct. 19, 1974  Japan.............................. 49-120491
Oct. 19, 1974  Japan.............................. 49-120492
July 23, 1975  Japan.............................. 50-89826

[52] U.S. Cl. .................... 260/37 SB; 260/46.5 UA; 260/825
[51] Int. Cl.² ......................................... C08L 83/04
[58] Field of Search ......... 260/37 SB, 825, 46.5 UA

[56] References Cited
UNITED STATES PATENTS 3,699,073   10/1972   Wada et al..................... 260/825 X
3,844,992   10/1974   Antonen...................... 260/37 SB X
3,907,742    9/1975   Tanaka et al................... 260/825 X

*Primary Examiner*—Lewis T. Jacobs
*Attorney, Agent, or Firm*—Toren, McGeady and Stanger

[57]  ABSTRACT

A silicone resin molding composition is proposed which comprises (a) a vinyl-containing organopolysiloxane composed of randomly copolymerized tri-, di- and mono-functional siloxane units in specific mole fractions, (b) a vinyl-containing organopolysiloxane with at least one block composed of from 5 to 1,000 of diorganosiloxane units bonded linearly to each other in an uninterrupted sequence, (c) an organohydrogenpolysiloxane which serves as a crosslinking agent and (d) a platinum catalyst. Being solid at room temperature, the silicone resin molding composition of the present invention is suitable for transfer molding and injection molding, and the molded articles obtained from the composition have the advantages of good dimensional stability with very small thermal expansion coefficients as well as small shrinkage in molding and in post-curing.

18 Claims, No Drawings

HEAT-CURABLE SILICONE RESIN COMPOSITIONS

FIELD OF THE INVENTION

The present invention relates to a novel heat-curable silicone resin composition or, in particular, to a silicone resin molding composition suitable for transfer molding which is solid at room temperature facilitating easy handling and is fabricated into various kinds of articles with very little shrinkage in the molding process giving molded and cured articles with dimensional stability or with small thermal expansion coefficients.

DESCRIPTION OF THE PRIOR ART

The silicone resin molding compositions known in the prior art are divided into two types according to the crosslinking mechanisms in curing, namely crosslinking by addition reaction and crosslinking by the condensation reaction.

The composition of the addition type comprises, in principle, an organopolysiloxane with vinyl groups directly bonded to the silicon atoms, an organohydrogenpolysiloxane with hydrogen atoms directly bonded to the silicon atoms and a platinum catalyst as the essential components. Various kinds of the silicone resin molding compositions of the addition type have been developed but none is known which is solid at room temperature. Even those formulated with a substantial amount of inorganic fillers have the consistency of liquid or putty rendering the handling of the composition very disadvantageously difficult in comparison with the molding compositions of powdery, granular or pelletized form when it is intended to mold the composition by transfer or injection molding.

On the other hand, the silicone resin molding composition of the condensation type comprises, in principle, an organopolysiloxane with hydroxy groups directly bonded to the silicon atoms in an amount of, say, at least 0.25% by weight, in which the molar ratio of the organic groups bonded to the silicon atoms and the silicon atoms is within the range from 1:1 to 1:1.7, and a catalyst for accelerating the condensation reaction as the essential components. Various kinds of the molding compositions of the condensation type have also been developed. They are solid usually at room temperature and easily handled as the feed for transfer molding or other molding processes.

The condensation-type molding compositions are, however, defective in several points. For example, the impurity level of electrolytes is high in them because the condensation catalyst most widely employed is a combination of a lead compound and a carboxylic acid or an ammonium carboxylate, and problems are inevitable in the use of them as parts of electronic devices or other electric circuits. The lead compound as one of the components of the catalyst is also disadvantgeous in the human health problem and from the standpoint of the environmental pollution. Molded articles made of the molding composition of the condensation type are apt to suffer blistering caused by the water produced by the condensation reaction in the curing step and such a defect is especially outstanding when the molded articles are very thick walled ones.

Sometimes, voids are found inside the molded articles of the conventional heat-curable silicone resin molding compositions leading to the inferior mechanical and electric properties. Moreover the conventional heat-curable silicone resin molding compositions exhibit remarkable shrinkage by curing in the molding process exerting very large stress to the inserts embedded inside the molded articles. The cured molded articles are also dimensionally unstable and the changes in the dimensions caused by the ambient conditions lead to the formation of crevices around the inserts inside the molded articles. When the inserts are made of metals, the difference in the thermal expansion coefficients of the metal inserts and the silicone resin molding composition is so large that the molded articles with metal inserts inside them often become cracked or become to have very large crevices around the inserts by heating or cooling, thus leading to the inferior appearances as well as the poor waterproofness, anti-solvent resistance, electric, mechanical and other properties.

OBJECTS OF THE INVENTION

The object of the invention is to provide heat-curable silicone resin molding compositions having easy processability and a low tendency to shrinkage during molding operations.

Another object of the invention to provide molded articles prepared from the compositions, having excellent mechanical strengths.

A further object of the invention is to provide articles produced from the compositions, having excellent anti-solvent properties.

A still further object of the invention is to provide articles produced from the compositions, having excellent dimensional stability.

SUMMARY OF THE INVENTION

The heat-curable silicone resin molding compositions in accordance of the present invention comprise a. 100 parts by weight of a vinyl-containing organopolysiloxane composed of randomly bonded organosiloxane units (i) $(R^1SiO_{1.5})$, (ii) $(R_2^1SiO)$ and (iii) $(R_3^1SiO_{0.5})$, where $R^1$ is a hydroxy groups directly bonded to the silicon atom or a substituted or unsubstituted monovalent hydrocarbon group and the mole fractions x, y and z for the units (i), (ii) and (iii) are $0.50 \leq x \leq 0.95$, $0.05 \leq y \leq 0.35$ and $0 \leq z \leq 0.05$, respectively, from 2.0 to 45.0 mole % of said hydrocarbon groups being vinyl groups and the amount of the hydroxy groups directly bonded to the silicon atoms being in the range from 0.75 to 7% by weight, b. from 10 to 150 parts by weight of a vinyl-containing organopolysiloxane with block structure composed of the organosiloxane units, (iv) $(R^2SiO_{1.5})$, (v) $(R_2^2SiO)$ and (vi) $(R_3^2SiO_{0.5})$ where $R^2$ is a substituted or unsubstituted monovalent hydrocarbon group, at least two of said $R^2$ groups in a molecule being vinyl groups, and the mole fractions $u$, $v$ and $w$ for said organosiloxane units (iv), (v) and (vi) are $0 \leq u \leq 0.6$, $0.07 \leq v \leq 0.998$ and $0 \leq w \leq 0.30$, respectively, including in a molecule at least one block composed of from 5 to 1,000 of the unit (v) bonded to each other linearly in an uninterrupted sequence, c. an organohydrogenpolysiloxane with at least two hydrogen atoms directly bonded to the silicon atoms in a molecule in an amount sufficient to give from 0.75 to 2.5 of said hydrogen atoms per vinyl group in the components (a) and (b) above, and d. a catalytic amount of a platinum catalyst.

DETAILED DESCRIPTION OF THE INVENTION

To explain the invention in further detail, the present invention is a result of the extensive investigation of the inventors to obtain a silicone resin molding composition easily processable and capable of giving excellent molded articles and has been completed by the discovery that the composition comprising above components (a) to (d) can just fulfill the requirements even when the content of the hydroxy groups directly bonded to the silicon atoms is so high as considered impractical in the prior art.

The component (a) in the composition of the present invention is an organopolysiloxane represented by the average unit formula

where the meanings of the symbols $R^1$, $x$, $y$ and $z$ are as defined above, and the organosiloxane units ($R^1SiO_{1.5}$), ($R_2^1SiO$) and ($R_3^1SiO_{0.5}$) are bonded to each other at random through siloxane linkages. It is preferable that from 2.0 to 45.0 mole % of the monovalent hydrocarbon groups bonded to the silicon atoms are vinyl groups. When the content of the vinyl groups is less than 2.0 mole % in the component (a), the density of crosslinkings formed by the addition reaction of the vinyl groups with the silicon-bonded hydrogen atoms in the component (c) is undesirably low resulting in the inferior mechanical properties of the articles molded with the composition, while higher vinyl content than 45.0 mole % results in the brittleness of the molded articles due to too high density of the crosslinkings.

The content of the hydroxy groups directly bonded to the silicon atoms is less than 7% by weight. When high mechanical strengths and high anti-solvent resistance are desired, the hydroxy content should be as high as possible, or higher than 0.75% by weight, but the hydroxy content exceeding 7% by weight causes the disadvantage or danger of blisters or voids in the molded articles.

With respect to the mole fractions $x$, $y$ and $z$ of the three kinds of the organosiloxane units, the mole fraction $x$ of the trifunctional monoorganosiloxane units is preferably within the range from 0.50 to 0.95. This limitation is derived from the requirements that the component (a) is solid at room temperature and readily becomes fluid when heated to a temperature between 140° and 200°C in order to obtain the easy processability of the composition as one of the objects of the present invention.

The vinyl-containing organopolysiloxane in conformity with the definition of the component (a) in the present composition composed of random copolymer of the three kinds of the organosiloxane units is prepared by known methods in which a mixture of two or more of the organohalosilanes or alkoxysilanes corresponding to the individual organosiloxane units is subjected to cohydrolysis-cocondensation. The trifunctional organosiloxane unit ($R^1SiO_{1.5}$) is exemplified by monovinylsiloxane, monomethylsiloxane, monoethylsiloxane, monopropylsiloxane, monophenylsiloxane, monoallylsiloxane, monocyclohexylsiloxane and monotolylsiloxane. The difunctional organosiloxane unit ($R_2^1SiO$) is exemplified by divinylsiloxane, phenylvinylsiloxane, methylvinylsiloxane, methylphenylsiloxane, ethylphenylsiloxane, propylphenylsiloxane, diphenylsiloxane, dimethylsiloxane, diethylsiloxane and dipropylsiloxane. The monofunctional organosiloxane unit ($R_3^1SiO_{0.5}$) is exemplified by trivinylsiloxane, divinylmethylsiloxane, divinylphenylsiloxane, vinyldimethylsiloxane, vinyldiphenylsiloxane, vinylphenylmethylsiloxane, trimethylsiloxane, dimethylphenylsiloxane, methyldiphenylsiloxane and triphenylsiloxane. Some of the hydrogen atoms in the organic groups of the organosiloxane units may be replaced with halogen atoms. The vinyl-containing organopolysiloxane as the component (a) can be a mixture of two or more of the organopolysiloxanes, each of which is not always in conformity with the definition for the component (a), insofar as the average mole fractions $x$, $y$ and $z$ and the average content of the hydroxy groups are within the range as defined. For example, an organopolysiloxane with the value of $x$ smaller than 0.50 may be mixed with that with the $x$ value larger than 0.95 in order to make a mixture of organopolysiloxanes in which the average value of $x$ is in the range from 0.50 to 0.95.

The component (b) plays a very important role in the composition of the present invention. The organopolysiloxane as the component (b) is composed of the organosiloxane units ($R^2SiO_{1.5}$), ($R_2^2SiO$) and ($R_3^2SiO_{0.5}$) and represented by the average unit formula ($R^2SiO_{1.5}$)$_u$($R_2^2SiO$)$_v$($R_3^2SiO_{0.5}$)$_w$, where the symbols $R^2$, $u$, $v$ and $w$ have the meanings as defined above, at least 2 of said $R^2$ groups being vinyl groups. It is the same as in the component (a) that the organopolysiloxane (b) is composed of the organosiloxane units selected from the tri-, di- and monoorganosiloxane units. The difference is, however, that the organopolysiloxane as the component (b) involves necessarily at least one linear block composed of from 5 to 1,000 members of the difunctional units bonded to each other linearly in an uninterrupted sequence in contrast to the organopolysiloxane as the component (a) in which the individual organosiloxane units are bonded to each other in a random sequence.

An organopolysiloxane in conformity with the above requirement for the component (b) is a linear diorganopolysiloxane (b-1) terminated at both chain ends with triorganosilyl groups represented by the general formula

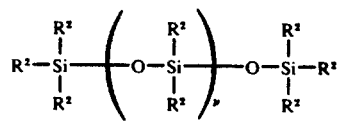

where $p$ is a positive integer in the range from 5 to 1,000. In the formula above, $R^2$ is selected from unsubstituted or halogen-substituted hydrocarbon groups and at least two of the $R^2$ groups in a molecule are vinyl groups directly bonded to the silicon atoms positioned, preferably, at or near the chain ends. The positive integer $p$ is, preferably, in the range from 20 to 500.

The other type of the organopolysiloxane as the component (b) is an organopolysiloxane (b-2) represented by the average unit formula

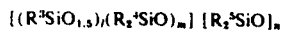

where $R^3$, $R^4$ and $R^5$ each have the same meaning as $R^2$ and $l$, $m$ and $n$ are the mole fractions in the ranges $0.002 \leq l \leq 0.6$, $0 \leq m \leq 0.7$ and $0.01 \leq n \leq 0.998$. In the formula above, the organosiloxane units $R^3SiO_{1.5}$ and $R_2^4SiO$ in the left side square brackets are bonded to each other at random to form one or more of three-dimentional random blocks, which in turn are bonded to the linear block or blocks formed by from 5 to 1,000 members each of the $R_2^5SiO$ units bonded to each other in an uninterrupted sequence. It is preferable that from 0.01 to 20 mole % of the organic groups $R^3$, $R^4$ and $R^5$ in the formula above are vinyl groups.

The method for the preparation of the organopolysiloxane (b-2) is known. For example, a diorganopolysiloxane with the polymerization degree from 5 to 1,000 terminated at both chain ends with silicon-bonded hydroxy groups and a cohydrolysis-cocondensation product of a mixture of monoorganotrihalosilanes, e.g., phenyltrichlorosilane and vinyltrichlorosilane, or a mixture of monoorganotrihalosilanes and diorganodihalosilanes, e.g., vinylmethyldichlorosilane and dimethyldichlorosilane, are subjected together to the dehydration condensation reaction in an organic solvent in the presence of a catalyst such as organometallic compounds or alkaline compounds. In this procedure, the ratios of the monoorganotrihalosilanes, the diorganodihalosilanes and the hydroxy-terminated diorganopolysiloxane are determined so that the limitations in the mole fractions $l$, $m$ and $n$ above in the resultant organopolysiloxane are satisfied.

The component (b) in the composition of the present invention may be the linear diorganopolysiloxane (b-1) alone, the organopolysiloxane with partial block structure (b-2) alone or a combination of both. When (b-1) alone or (b-2) alone is employed as the component (b), it is preferable that from 10 to 100 parts by weight of the component (b) is employed per 100 parts by weight of the component (a). On the other hand, when the component (b) is a combination of (b-1) and (b-2), it is preferable that the component (b) is composed of from 10 to 100 parts or, more preferably, from 20 to 60 parts by weight of the (b-1) and less than 50 parts by weight of the (b-2) per 100 parts by weight of the component (a) in order to obtain a synergistic effect of (b-1) and (b-2) to the full extent.

When the amount of the component (b) is smaller than that given above, the desired effects of small thermal expansion coefficients, high dimensional stability and little tendency toward crack formation of the molded articles cannot be attained and, when the amount of it exceeds the range specified above, a disadvantageous effect is brought about to the thermal curing of the composition.

The component (c) in the composition of the present invention is an organohydrogenpolysiloxane having at least two hydrogen atoms directly bonded to the silicon atoms in a molecule without specific limitations in the molecular structure. Thus, various kinds of known organohydrogenpolysiloxanes with straightchain, branched-chain or cyclic-chain structures are suitable for the purpose. It is advantageous, however, that the organohydrogenpolysiloxane has a viscosity higher than 50 centistokes at 25°C in order that the resultant silicone resin molding composition is solid at room temperature. Of course, it is optional that small amounts of an organohydrogenpolysiloxane with a lower viscosity than 50 centistokes at 25°C is employed as part of the component (c).

The organic groups bonded to the silicon atoms in the component (c) may be unsubstituted or halogen-substituted monovalent hydrocarbon groups, such as, alkyl groups exemplified by methyl, ethyl and propyl groups and aromatic groups exemplified by phenyl; 2-phenylethyl and 2-phenylpropyl groups. It is preferable that from 5 to 40 mole % of the organic groups in the organohydrogenpolysiloxane are aromatic hydrocarbon groups from the standpoint of compatibility with the component (a).

The amount of the component (c) to be formulated in the composition of the present invention is such that from 0.75 to 2.5 or, preferably, from 1.0 to 1.5 hydrogen atoms directly bonded to the silicon atom are given per vinly group directly bonded to the silicon atoms in the components (a) and (b) in order to obtain a resin composition capable of giving molded articles with excellent mechanical and other properties.

Several examples suitable as the component (c) are as follows.

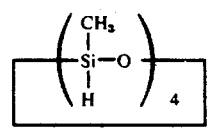

(1)

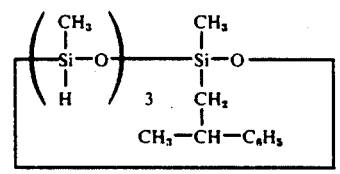

(2)

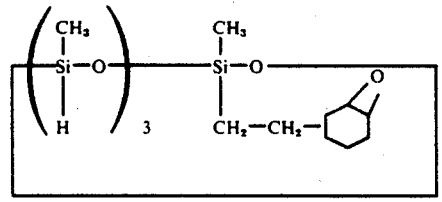

(3)

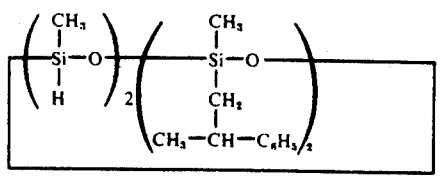
(4)

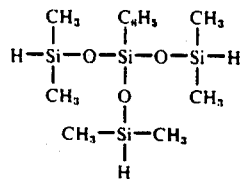
(5)

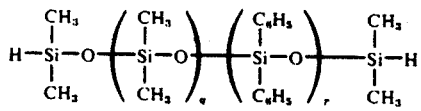
(6)

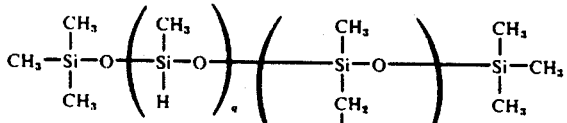
(7)

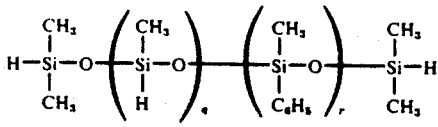
(8)

$(q \geqq 2, r \geqq 1)$

The component (d) in the composition of the present invention is a platinum catalyst known in the prior art as a catalyst for the addition reaction between a vinyl-containing organopolysiloxane and an organohydrogenpolysiloxane. Several of the examples are chloroplatinic acid, alcohol-modified chloroplatinic acid, complexes of chloroplatinic acid with olefins, platinum black and platinum catalysts borne on a silica or alumina carrier. The amount of the platinum catalyst to be employed is determined in accordance with the desired curing velocity but, in general, from 1 to 20 p.p.m. by weight as platinum is sufficient based on the total amount of the components (a) to (c).

In addition to the components (a) to (d) above, various kinds of inorganic fillers may be admixed to the composition of the present invention. Several of the inorganic fillers suitable for the purpose include zirconium silicate, chopped glass fibers, alumina, powdered fused quartz, diatomaceous earth, fume silica, precipitated silica, magnesium silicate and aluminum silicate, and the former four are the most preferred ones. It is recommended to use the inorganic fillers in substantial amounts so as to obtain resin compositions in solid state at room temperature, or eliminate the difficulty of obtaining solid resin compositions especially when relatively large amount of the organohydrogensiloxane as the component (c) is employed. The amount of the inorganic filler employed is from 5 to 500 parts by weight per 100 parts by weight of the total amount of the components (a) to (c) or from 150 to 450 parts by weight when a resin composition suitable for transfer molding is intended. Specifically, the amount is better determined in the range from 50 to 150 parts by weight when the inorganic filler is chopped glass fibers.

Pigments or other coloring agents are also employed to impart desired colors to the resin composition.

Furthermore various kinds of mold-release agents are optionally added to the resin composition of the present invention in order to facilitate taking out the molded articles from the metal molds. The mold-release agents suitable for the purpose include fatty acid salts of metals such as calcium stearate. Usually less than 1% by weight of a mold-release agent is sufficient based on the component (a).

The heat-curable silicone resin composition of the present invention is prepared by blending the above-named components homogeneously under heating by use of a suitable blending apparatus such as a roller blender, Henschel mixer and Banbury mixer. The order of blending of the individual components has no specific limitations but it is recommendable that the platinum catalyst is added in the last stage in order to avoid the possible too early curing of the composition by the catalytic action of the catalyst still in the course of the blending process. It is optional, if necessary, to add a known retarding agent for the activity of the platinum catalyst, such as, organophosphorus compounds, halocarbons, acetylenic compounds and sulfoxide compounds. The thus prepared composition after completion of blending is cooled usually to become solid at room temperature and then crushed or cut to an appropriate dimension to give the silicone resin composition of the object in granular or pellet form.

The silicone resin molding compositions obtained as above become softened and capable of flowing by being heated above 160°C or so and then rapidly cured and hardened by the catalytic action of the platinum catalyst. Therefore the compositions are suitable for the materials used in transfer molding or injection molding.

The silicone resin composition of the present invention is, as stated before, almost free from any electrolyte impurities and can find very wide applications not only as an encapsulating resin for various kinds of electronic parts but also as a molding composition for making connectors, plugs, coil bobbins and the like.

Following are the examples to illustrate the present invention. In the examples, parts are all parts by weight, and "Me", "Ph" and "Vi" as mentioned in the various formulas represent methyl, phenyl and vinyl groups, respectively.

EXAMPLE 1.

This example provides a procedure for synthesizing randomly-copolymerized vinyl-containing organopolysiloxanes as the component (a) with relatively low hydroxy contents.

A mixture composed of 1057.7 g of phenyltrichlorosilane, 854.3 g of methyltrichlorosilane, 180.7 g of diphenyldichlorosilane, 402.9 g of methylvinyldichlorosilane, and 1,567 g of toluene was dropped into a mixture of 1,500 g of isopropanol and 6,535 g of water under vigorous agitation over a period of 60 minutes followed by the additional 60 minutes of agitation. The organic layer separated on standing was washed with water to neutral to obtain a siloxane solution, which was then, with addition of 0.42 g of potassium hydroxide, heated for 5 hours under reflux to polymerize the siloxane and further agitated for 60 minutes at room temperature. The alkali was neutralized by adding 13.8 g of trimethylchlorosilane and the solution was filtered and stripped of the organic solvents by distillation under reduced pressure to give 1,110 g of a randomly-copolymerized vinyl-containing organopolysiloxane A which was a clear solid at room temperature. The ratio of the triorganosiloxane units in all of the siloxane units was 75 mole %, the ratio of the vinyl groups in all of the organic groups was 16.0 mole %, the number of the organic groups per one silicon atom was 1.24 and the hydroxy content was 0.34% by weight in the organopolysiloxane A.

Similarly, three more kinds of randomly-copolymerized vinyl-containing organopolysiloxanes B to D were prepared with mixtures of the organochlorosilanes.

The mole fractions of the individual organosiloxane units in each of the organopolysiloxanes A to D are summarized in Table I below together with the hydroxy contents in them in % by weight.

Table I

| Organopolysiloxane | | A | B | C | D |
|---|---|---|---|---|---|
| Mole fraction of siloxane units, % | PhSiO$_{1.5}$ | 35 | 35 | 55 | 40 |
| | MeSiO$_{1.5}$ | 40 | 40 | 0 | 30 |
| | MeViSiO | 20 | 20 | 20 | 26 |
| | Ph$_2$SiO | 5 | 5 | 0 | 4 |
| | Me$_2$SiO | 0 | 0 | 25 | 0 |
| Hydroxy content, % by weight | | 0.34 | 1.20 | 0.25 | 0.30 |

EXAMPLE 2.

This example provides a procedure for synthesizing randomly-copolymerized vinyl-containing organopolysiloxanes as the component (a) with relatively high hydroxy contents.

A mixture of phenyltrichlorosilane, diphenyldichlorosilane, methylvinyldichlorosilane, methyltrichlorosilane and toluene each in the same amounts as in the preparation of the organopolysiloxane A above was dropped into a mixture of 1,000 g of acetone and 6,535 g of water over a period of 60 minutes under agitation. The organic layer separated on standing was washed with water to neutral and then stripped of the toluene by distillation under reduced pressure to give a clear organopolysiloxane E with a hydroxy content of 3.00 % by weight.

Similarly, organopolysiloxanes F and G were prepared. Table II below summarizes the mole fractions of the individual organosiloxane units in each of the randomly-copolymerized vinyl-containing organopolysiloxanes E to G together with the hydroxy contents in them.

Table II

| Organopolysiloxane | | E | F | G |
|---|---|---|---|---|
| Mole fraction of siloxane units, % | PhSiO$_{1.5}$ | 35 | 34 | 40 |
| | MeSiO$_{1.5}$ | 40 | 26 | 34 |
| | MeViSiO | 20 | 30 | 26 |
| | Ph$_2$SiO | 5 | 5 | 0 |
| | Me$_2$SiO | 0 | 5 | 0 |
| Hydroxy content, % by weight | | 3.00 | 6.50 | 3.50 |

EXAMPLE 3.

This example provides a procedure for synthesizing an organopolysiloxane with partial block structure as the component (b-2).

A mixture of 422 g of a dimethylpolysiloxane with the polymerization degree 20 to 30 terminated at both chain ends with hydroxy groups, 338 of phenyltrichlorosilane, 448 g of vinyltrichlorosilane and 430 g of toluene was dropped into 2,000 g of water at 35° to 45°C under agitation over a period of 60 minutes followed by additional 30 minutes of agitation. The organic layer separated on standing was washed with water to neutral and then subjected to condensation reaction at 114°C for 7 hours with addition of 2.5 g of zinc octoate with subsequent stripping of toluene. The thus obtained organopolysiloxane had a softening point of 80° to 90°C and partial block structure expressed by the following average formula.

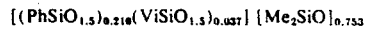

EXAMPLE 4.

By use of a two-roller mill were blended 100 parts of the randomly-copolymerized vinyl-containing organopolysiloxane B obtained in Example 1 above, 30 parts of the vinyl-containing organopolysiloxane with partial block structure obtained in Example 3 above, 273 parts of fused quartz powder, 185 parts of chopped glass fiber, 0.8 part of aluminum stearate and 2.2 parts of a black pigment at 80° to 95°C for 15 minutes. The mixture was further kneaded for additional 3 minutes after addition of 32.8 parts of an organohydrogenpolysiloxane expressed by the formula

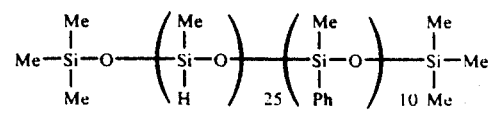

and 0.04 part of a 1:1 mixture of 2-ethylhexanolmodified chloroplatinic acid with a concentration 2% by weight as platinum and a compound expressed by the formula

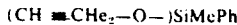

as a retarder for the platinum catalyst. This catalyst mixture is called hereinafter C-1.

The silicone resin composition thus prepared had a spiral flow of 40 inches, shrinkage in molding 0.64 %, shrinkage in post-curing 0.51%, linear thermal expansion coefficient of the post-cured articles 2.71 × $10^{-5}$/°C and satisfactory heat-curability. These characteristics were determined or estimated as follows.

Spiral flow: The spiral flow of the silicone resin composition to be tested was measured with a spiral flow tester made by Hulls Co. with the testing conditions of the molding temperature 175°C and the molding pressure 56 kg/cm².

Shrinkage in molding: The silicone resin composition was molded with the molding conditions of the molding temperature 175°C, molding pressure 56 kg/cm² and molding time 3 minutes. The shrinkage in molding was calculated by comparing the corresponding dimensions of the metal mold and the articles as molded.

Shrinkage in post-curing: The articles molded as above were subjected to post-curing at 200°C for 2 hours and the shrinkage in post-curing was calculated by comparing the corresponding dimensions of the articles as molded and post-cured.

Linear thermal expansion coefficient: It was determined in accordance with the method specified in ASTM D 696 in the temperature range from 25 to 150°C.

The heat-curability was judged by the extent of curing after heating of the silicone resin composition at 175°C for 3 minutes.

EXAMPLE 5.

A silicone resin composition was prepared similarly as in the preceding example with 100 parts of the organopolysiloxane B, 60 parts of the organopolysiloxane with partial block structure obtained in Example 3, 328 parts of fused quartz powder, 222.2 parts of chopped glass fiber, 1.0 part of aluminum stearate, 2.8 parts of a black pigment, 35.4 parts of an organohydrogenpolysiloxane expressed by the formula

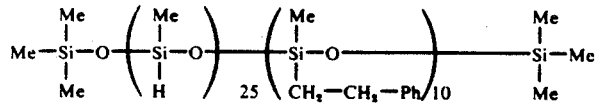

and 0.04 part of the catalyst mixture C-1. The properties of the composition were: spiral flow 29 inches; shrinkage in molding 0.61%; shrinkage in post-curing 0.65%; linear thermal expansion coefficient of the post-cured articles 3.96 × $10^{-5}$/°C; and satisfactory curing at 175°C for 3 minutes.

EXAMPLE 6.

The formulation was the same as in Example 5 except that 30 parts of a vinyl-containing organopolysiloxane expressed by the formula

was employed as the organopolysiloxane with partial block structure instead of 60 parts of the siloxane obtained in Example 3. The resultant silicone resin composition had following properties: spiral flow 25 inches shrinkage in molding 0.64%; shrinkage in post-curing 0.73%; linear thermal expansion coefficient of the post-cured articles 3.79 × $10^{-5}$/°C; and satisfactory curing at 175°C for 3 minutes.

EXAMPLE 7.

A silicone resin composition was prepared by blending, as in Example 4, 100 parts of the randomly-copolymerized vinyl-containing organopolysiloxane B 10 parts of a dimethylpolysiloxane terminated at both chain ends with vinyl groups and expressed by the formula

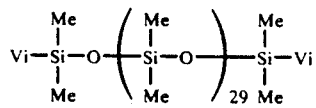

20 parts of an organopolysiloxane with partial block structure expressed by the formula

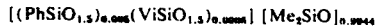

273 parts of fused quartz powder, 185 parts of chopped glass fiber, 0.8 part of aluminum stearate, 2.2 parts of a black pigment, 32.8 parts of an organohydrogenpolysiloxane expressed by the formula

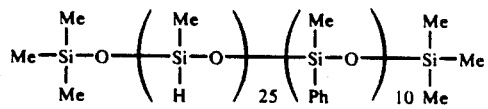

and 0.04 part of the catalyst mixture C-1. The properties of the resin composition thus prepared were as follows: spiral flow 38 inches; shrinkage in molding 0.49%; shrinkage in post-curing 0.52%; linear thermal expansion coefficient of the post-cured articles 3.5 × $10^{-5}$/°C; and satisfactory curing at 175°C for 3 minutes.

EXAMPLE 8.

The formulation of the resin composition was the same as in Example 5 except that 60 parts of an organopolysiloxane with partial block structure expressed by the formula

was employed instead of 60 parts of the siloxane obtained in Example 3. The properties of the silicone resin composition prepared with the formulation above were as follows: spiral flow 30 inches; shrinkage in molding 0.33%; shrinkage in post-curing 0.44%; and linear thermal expansion coefficient of the post-cured articles 2.7 × $10^{-5}$/°C.

EXAMPLE 9.

The formulation of the resin composition was the same as in Example 5 except that 60 parts of an organopolysiloxane with partial block structure expressed by the formula

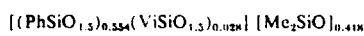
[(PhSiO$_{1.5}$)$_{0.334}$(ViSiO$_{1.5}$)$_{0.028}$] [Me$_2$SiO]$_{0.418}$ was employed instead of 60 parts of the siloxane obtained in Example 3. The properties of the silicone resin composition prepared with the formulation above were as follows: spiral flow 26 inches; shrinkage in molding 0.52%; shrinkage in post-curing 0.57%; and linear thermal expansion coefficient of the post-cured articles 3.89 × 10$^{-5}$/°C.

Control 1.

A silicone resin composition was prepared with 100 parts of the randomly-copolymerized vinyl-containing organopolysiloxane B, 32 parts of the same organohydrogenpolysiloxane as in Example 4, 215.6 parts of fused quartz powder, 92.4 parts of chopped glass fiber, 0.8 part of aluminum stearate, 2.2 parts of a black pigment and 0.04 part of the catalyst mixture C-1 in a same manner as in Example 4 except that component (b) was not used. The properties of the resin composition thus prepared were as follows: spiral flow 25 inches; shrinkage in molding 0.69%; shrinkage in post-curing 0.60%; linear thermal expansion coefficient of the post-cured articles 5.02 × 10$^{-5}$/°C; and satisfactory curing at 175°C for 3 minutes.

Control 2.

A silicone resin composition was prepared with the same formulation as in Example 5 except that 60 parts of the organopolysiloxane with partial block structure was replaced with 30 parts of an organopolysiloxane with no vinyl groups expressed by the formula

(PhSiO$_{1.5}$)$_{0.333}$(Me$_2$SiO)$_{0.667}$.

The resin composition thus prepared gelled by heating at 175°C for 3 minutes but could not give molded articles with sufficient mechanical strengths.

EXAMPLE 10.

A silicone resin composition was prepared by blending 100 parts of the randomly-copolymerized vinyl-containing organopolysiloxane B, 40 parts of a linear vinyl-containing diorganopolysiloxane expressed by the formula

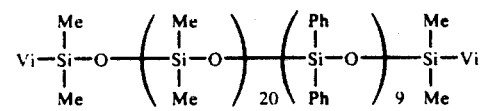

316.4 parts of fused quartz powder and 135.6 parts of chopped glass fiber by use of a two-roller mill at 75° to 85°C for 10 minutes followed by further kneading of the mixture for about 2 minutes after addition of 53.6 parts of the same organohydrogenpolysiloxane as in Example 5 and 0.04 part of the catalyst mixture C-1. The properties of thus prepared resin composition were as follows: spiral flow 36 inches; shrinkage in molding 0.52%; shrinkage in post-curing 0.44%; linear thermal expansion coefficient of the post-cured articles 3.53 × 10$^{-5}$/°C; and satisfactory curing at 175°C for 3 minutes.

EXAMPLE 11.

The preparation in Example 10 above was repeated with the same formulation except that the linear vinyl-containing diorganopolysiloxane employed here was expressed by the following formula.

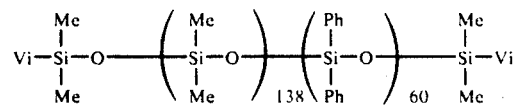

The properties of the resin composition thus prepared were as follows: shrinkage in molding 0.76%; shrinkage in post-curing 0.94%; and linear thermal expansion coefficient of the post-cured articles 4.90 × 10$^{-5}$/°C.

EXAMPLE 12.

The preparation in Example 11 was repeated with the same formulation except that the amount of the linear vinyl-containing diorganopolysiloxane was decreased to 20 parts instead of 40 parts. The properties of the thus prepared resin composition were as follows: shrinkage in molding 0.68%; shrinkage in post-curing 0.83%; and linear thermal expansion coefficient of the post-cured articles 4.90 × 10$^{-5}$/°C.

EXAMPLE 13.

The preparation of Example 10 was repeated with the same formulation except that the linear vinyl-containing diorganopolysiloxane employed here was expressed by the following formula

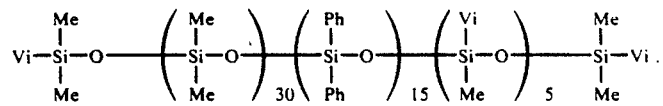

The properties of the thus prepared resin composition were as follows: shrinkage in molding 0.72%; shrinkage in post-curing 0.82%; and linear thermal expansion coefficient of the post-cured articles 4.70 × 10$^{-5}$/°C.

EXAMPLE 14.

By use of a two-roller mill heated at 80 to 95°C were blended 15 parts of the randomly-copolymerized organopolysiloxane F obtained in Example 2, 35 parts of the randomly-copolymerized organopolysiloxane A obtained in Example 1, the average hydroxy content of the organopolysiloxanes F and A being 1.14% by weight, 15 parts of an organopolysiloxane expressed by the average unit formula

[(PhSiO$_{1.5}$)$_{0.21}$ (ViSiO$_{1.5}$)$_{0.037}$] [Me$_2$SiO]$_{0.753}$.

the dimethyl siloxane units being present in linear blocks each composed of from 20 to 30 of the units bonded to each other linearly in an uninterrupted sequence, 136.5 parts of fused quartz powder, 92.5 parts of chopped glass fiber, 0.4 part of aluminum stearate and 1.1 parts of a black pigment for 15 minutes followed by further kneading of the mixture in a hot roller mill at 75° to 85°C for 2 minutes after addition of 16.4 parts of an organohydrogenpolysiloxane expressed by the formula

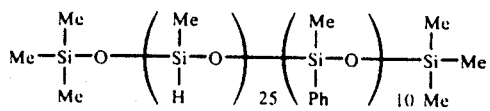

and 0.02 part of the catalyst mixture C-1 to give a silicone resin molding composition. The spiral flow of the composition was 37 inches. The composition was molded first by press-curing at 175°C, 56 kg/cm$^2$ for 2 minutes and then by post-curing at 200°C for 2 hours to give cured molded articles with dimensions in accordance with ASTM D 696. The flexural strength of the cured articles was 4.6 kg/mm$^2$ and the anti-solvent resistance of them, expressed by the weight increase in % after immersion of the articles in toluene for 24 hours at room temperature, was 5.2%.

Control 3.

Similarly as above, another silicone resin composition was prepared with the same formulation except that the randomly-copolymerized vinyl-containing organopolysiloxane was 50 parts of the organopolysiloxane A instead of the mixture of A and F. The composition thus prepared had a spiral flow of 27 inches. The post-cured articles molded with this composition had a flexural strength of 3.7 kg/mm$^2$ but the anti-solvent resistance of the articles was poor and they became swelled and disintegrated into pieces by immersion in toluene.

EXAMPLE 15.

The preparation in Example 14 was repeated with the same formulation except that the amounts of the organopolysiloxanes F and A were 8 parts and 42 parts, respectively, giving the average hydroxy content of 0.766% by weight, instead of 15 parts and 35 parts. The properties of the resin composition and the post-cured articles molded therewith were as follows: spiral flow 41 inches; flexural strength 4.5 kg/mm$^2$; and anti-solvent resistance 6.7%.

EXAMPLE 16.

The preparation in Example 14 was repeated with the same formulation except that the amounts of the organopolysiloxanes F and A were both 25 parts giving the average hydroxy content of 1.67% by weight instead of 15 parts and 35 parts. The properties of the post-cured articles molded with the resin composition prepared as above were as follows: flexural strength 5.2 kg/mm$^2$ and anti-solvent resistance 2.8%.

EXAMPLES 17–19 and Control 4.

Four kinds of silicone resin compositions were prepared with varied amounts of the organopolysiloxanes D and G as shown in Table III below, the total amounts of D and G being always 15 parts and the average hydro contents of D and G being given in the table for each of the formulations. By use of a two-roller mill heated at 75° to 85°C were blended the organopolysiloxanes D and G each in the amounts shown in Table III and 57.2 parts of fused quartz powder for 10 minutes followed by further kneading in the two-roller mill after addition of 6.3 parts of an organopolysiloxane with partial block structure expressed by the formula

in which the dimethylsiloxane units were present in linear blocks by being bonded to each other in linear uninterrupted sequences of each 20 to 30 of the units, 38.1 parts of chopped glass fiber, 0.7 part of a black pigment, 0.1 part of calcium stearate, 6.8 parts of an organohydrogenpolysiloxane expressed by the formula

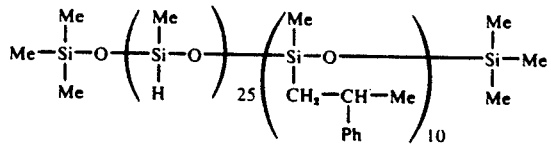

1.6 parts of tris(dimethylhydrogensiloxy)phenylsilane and 0.02 part of the catalyst mixture C-1 successively, to give silicone resin molding compositions. The spiral flow values of the compositions and the flexural strengths and linear thermal expansion coefficients of the post-cured articles molded therewith are given in the table. The cured articles prepared by Control 4 were inferior in their resistance to solvents, disintegrating into pieces by immersion in toluene.

Table III

| | Example 17 | Example 18 | Example 19 | Control 4 |
|---|---|---|---|---|
| Organopolysiloxane D, parts | 10.5 | 7.5 | 0 | 15 |
| Organopolysiloxane G, parts | 4.5 | 7.5 | 15 | 0 |
| Hydroxy content, % by weight | 1.26 | 1.90 | 3.50 | 0.30 |
| Flexural strength, kg/mm$^2$ | 6.8 | 6.8 | 7.0 | 5.0 |
| Thermal expansion coefficient, $\times 10^{-5}$/°C | 3.0 | 2.9 | 2.6 | 3.7 |
| Spiral flow, inches | 25 | 30 | 40 | 14 |

EXAMPLE 20.

The preparation in Example 14 was repeated with the same formulation except that 50 parts of the organopolysiloxane B was employed as the randomly-copolymerized vinyl-containing organopolysiloxane instead of the organopolysiloxanes F and A. The properties of the post-cured articles molded with the composition thus prepared were as follows: flexural strength 4.8 kg/mm² and anti-solvent resistance 4.5%.

EXAMPLE 21.

By use of a hot two-roller mill were blended 10 parts of the randomly-copolymerized vinyl-containing organopolysiloxane C and 5 parts of the organopolysiloxane E, the average hydroxy content of the organopolysiloxanes C and E being 2.33% by weight, and 57.2 parts of fused quartz powder uniformly for 10 minutes followed by further kneading of the mixture at 75 to 85°C after addition of 6.3 parts of an organopolysiloxane with partial block structure expressed by the formula

in which the dimethylsiloxane units were present in blocks of 20 to 30 each of the units by being bonded to each other linearly in uninterrupted sequences, 0.7 part of a black pigment, 0.1 part of cobalt stearate, 6.8 parts of an organohydrogenpolysiloxane expressed by the formula

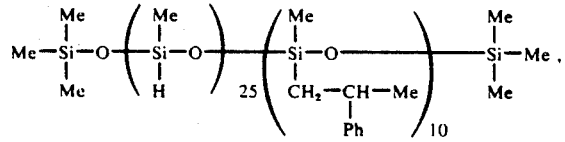

1.6 parts of a cyclic organohydrogenpolysiloxane expressed by the formula

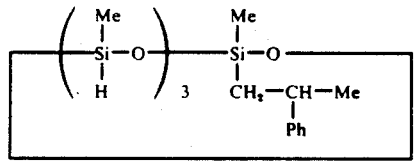

and 0.02 part of the catalyst C-1 successively, to give a silicone resin molding composition. The properties of the composition and the finally cured articles molded therewith were as follows: spiral flow 64 inches; flexural strength 5.8 kg/mm²; and anti-solvent resistance 0.9%. When the post-curing was extended to 4 hours instead of 2 hours, the flexural strength of the molded articles increased to 7.0 kg/mm².

Control 5.

The preparation in Example 21 was repeated with the same formulation except that the organopolysiloxane E as one of the randomly-copolymerized vinyl-containing organopolysiloxanes had been treated with trimethylchlorosilane to decrease the hydroxy content to 0.5% by weight. The average hydroxy content of the organopolysiloxanes C and thus treated E being 0.33% by weight. The spiral flow of the composition obtained above was 50 inches and the post-cured articles molded therewith had an anti-solvent resistance of 3.8% and a flexural strength of 4.8 kg/mm² after 2 hours of post-curing at 200°C and 5.5 kg/mm² after 4 hours of post-curing. The antisolvent resistance of the cured articles was somewhat poor and numbers of small cracks were formed on the surface by immersion in toluene.

What is claimed is:

1. A silicone resin molding composition which comprises
   a. 100 parts by weight of an organopolysiloxane composed of the organosiloxane units (i) $(R^1SiO_{1.5})$, (ii) $(R_2{}^1SiO)$ and (iii) $(R_3{}^1SiO_{0.5})$ bonded to each other at random, where $R^1$ is a hydroxy group directly bonded to the silicone atom or a substituted or unsubstituted monovalent hydrocarbon group, from 2.0 to 45.0 mole % of said hydrocarbon group being vinyl groups and the amount of said hydroxy groups being in the range from 0.75 to 7% by weight, and the mole fractions $x$, $y$ and $z$ for the organosiloxane units (i), (ii) and (iii) are from 0.50 to 0.95 inclusive, from 0.05 to 0.35 inclusive and from 0 to 0.05 inclusive, respectively,
   b. from 10 to 150 parts by weight of an organopolysiloxane composed of the organosiloxane units, (iv) $(R^2SiO_{1.5})$, (v) $(R_2{}^2SiO)$ and (vi) $(R_3{}^2SiO_{0.5})$ and including in a molecule at least one block composed of from 5 to 1,000 of the organosiloxane units (v) bonded to each other linearly in an uninterrupted sequence, where $R^2$ is a substituted or unsubstituted monovalent hydrocarbon group, at least two of said $R^2$ groups in a molecule being vinyl groups, and the mole fractions $u$, $v$ and $w$ for the organosiloxane units (iv), (v) and (vi) are from 0 to 0.6 inclusive, from 0.07 to 0.998 inclusive and from 0 to 0.30 inclusive, respectively,
   c. an organohydrogenpolysiloxane with at least two hydrogen atoms directly bonded to the silicon atoms in a molecule in an amount sufficient to give from 0.75 to 2.5 of said hydrogen atoms per one of the vinyl groups in the components (a) and (b) above, and
   d. a catalytic amount of a platinum catalyst.

2. The silicone resin molding composition as claimed in claim 1 wherein the hydrocarbon group in said component (a) is selected from the class consisting of vinyl, methyl, ethyl, phenyl, and allyl groups.

3. The silicone resin molding composition as claimed in claim 1 wherein the hydrocarbon group in said component (b) is selected from the class consisting of vinyl, methyl and phenyl.

4. The silicone resin molding composition as claimed in claim 1 wherein said component (b) is a linear diorganopolysiloxane composed of from 5 to 1,000 of diorganosiloxane units and terminated at both chain ends with triorganosilyl groups.

5. The silicone resin molding composition as claimed in claim 1 wherein said component (b) is a linear diorganopolysiloxane composed of from 20 to 500 of diorganosiloxane units and terminated at both chain ends with triorganosilyl groups.

6. The silicone resin molding composition as claimed in claim 4 wherein at least two of the organic groups contained in said diorganopolypiloxane are vinyl groups directly bonded to the silicone atoms positioned at the chain ends.

7. The silicone resin molding composition as claimed in claim 1 wherein said component (b) is an organopolysiloxane with partial block structure expressed by the formula

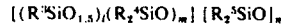

where $R^3$, $R^4$ and $R^5$ each have the same meaning as $R^2$ above and $l$, $l$, $m$ and $n$ each are mole fractions in the ranges $0.002 \leq l \leq 0.6$, $0 \leq m \leq 0.7$ and $0.01 \leq n \leq 0.998$, respectively, and the organosiloxane units $R^3SiO_{1.5}$ and $R_2^4SiO$ are bonded to each other at random, while the organosiloxane units $R_2^5SiO$ are bonded to each other to form one or more of the linear blocks each consisting of from 5 to 1,000 of said $R_2^5SiO$ units in an uninterrupted sequence.

8. The silicone resin molding composition as claimed in claim 7, wherein from 0.01 to 20 mole % of said groups $R^3$, $R^4$ and $R^5$ are vinyl groups directly bonded to the silicon atoms.

9. The silicone resin molding composition as claimed in claim 1, wherein said component (b) is a mixture of from 10 to 100 parts by weight of a linear diorganopolysiloxane composed of from 5 to 1,000 of diorganosiloxane units and terminated at both chain ends with triorganosilyl groups and less than 50 parts by weight of an organopolysiloxane with partial block structure expressed by the formula

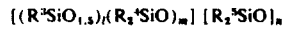

where $R^3$, $R^4$ and $R^5$ each have the same meaning as $R^2$ above and $l$, $m$ and $n$ each are the mole fractions in the ranges $0.002 \leq l \leq 0.6$, $0 \leq m \leq 0.7$ and $0.01 \leq n \leq 0.998$, respectively, and the organosiloxane units $R^3SiO_{1.5}$ and $R_2^4SiO$ are bonded to each other at random while the organosiloxane units $R_2^5SiO$ are bonded to each other to form one or more of the linear blocks each consisting of from 5 to 1,000 of said $R_2^5SiO$ units in an uninterrupted sequence, per 100 parts by weight of said component (a).

10. The silicone resin molding composition as claimed in claim 1 wherein said component (c) is an organohydrogenpolysiloxane having a viscosity higher than 50 centistokes at 25°C.

11. The silicone resin molding composition as claimed in claim 1 wherein from 5 to 40 mole % of the organic groups bonded to the silicon atoms in said component (c) are aromatic hydrocarbon groups.

12. The silicone resin molding composition as claimed in claim 1 which comprises 100 parts by weight of said component (a), from 10 to 150 parts by weight of said component (b), said component (c) in an amount sufficient to give from 1.0 to 1.5 hydrogen atoms directly bonded to the silicon atoms per one of the vinyl groups in said components (a) and (b), and a catalytic amount of said component (d).

13. The silicone resin molding composition as claimed in claim 1 wherein an inorganic filler is additionally added.

14. The silicone resin molding composition as claimed in claim 13 wheren said inorganic filler is a combination of fused quartz powder and chopped glass fiber.

15. The silicone resin molding composition as claimed in claim 13 wherein the amount of said inorganic filler is from 5 to 500 parts by weight per 100 parts by weight of the total amount of components (a) to (c).

16. The silicone resin molding composition as claimed in claim 14 wherein the amount of said combination is from 150 to 450 parts by weight per 100 parts by weight of the total amount of components (a) to (c).

17. The silicone resin molding composition as claimed in claim 16 wherein the amount of said chopped glass fiber is from 50 to 150 parts by weight per 100 parts by weight of the total amount of components (a) to (c).

18. The silicone resin molding composition as claimed in claim 1 wherein a mold-release agent is additionally added.

* * * * *